US012811269B2

(12) United States Patent
Ahmed et al.

(10) Patent No.: US 12,811,269 B2
(45) Date of Patent: Nov. 24, 2026

(54) NEAR-FIELD COUPLER FOR A HIGHLY EFFICIENT AND COMPACT RF-PHOTONIC RECEIVER WITH APPLICATIONS IN SPACEBORNE RADARS

(71) Applicant: California Institute of Technology, Pasadena, CA (US)

(72) Inventors: Razi U. Ahmed, Pasadena, CA (US); Vladimir S. Iltchenko, La Canada, CA (US); Ninoslav Majurec, Pasadena, CA (US); Dmitry V. Strekalov, Arcadia, CA (US); Andrey B. Matsko, Arcadia, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 49 days.

(21) Appl. No.: 18/539,877

(22) Filed: Dec. 14, 2023

(65) Prior Publication Data

US 2024/0213649 A1 Jun. 27, 2024

Related U.S. Application Data

(60) Provisional application No. 63/432,898, filed on Dec. 15, 2022.

(51) Int. Cl.
*H01P 7/10* (2006.01)
*G02B 6/122* (2006.01)
*H01P 1/213* (2006.01)

(52) U.S. Cl.
CPC ............ *H01P 7/105* (2013.01); *G02B 6/1225* (2013.01); *H01P 1/213* (2013.01)

(58) Field of Classification Search
CPC ........ H01P 7/105; H01P 1/213; G02B 6/1225
USPC .............................. 333/24 R, 219, 245, 248
See application file for complete search history.

(56) References Cited

U.S. PATENT DOCUMENTS 8,498,539 B1 * 7/2013 Ilchenko ................ H04B 10/90 398/115
2023/0246318 A1 * 8/2023 Fonseca .................. H01P 1/161 333/137
2024/0162622 A1 * 5/2024 Murakowski .......... H01Q 15/08

OTHER PUBLICATIONS

Abedin, K.S.; Ito, H. Temperature-dependent Dispersion Relation of Ferroelectric Lithium Tantalate. Journal of Applied Physics 1996, 80, 6561-6563.
Alferness, R. Waveguide Electrooptic Modulators. Microwave Theory and Techniques, IEEE Transactions on 1982, 30, 1121-1137.
Andrews, R.W.; Peterson, R.W.; Purdy, T.P.; Cicak, K.; Simmonds, R.W.; Regal, C.A.; Lehnert, K.W. Bidirectional and Efficient Conversion between Microwave and Optical Light. Nat. Phys. 2014, 10, 321-326.

(Continued)

*Primary Examiner* — Jorge L Salazar, Jr.
(74) *Attorney, Agent, or Firm* — GATES & COOPER LLP

(57) ABSTRACT

A device useful as a receiver including a waveguide interface to an antenna guiding a radio frequency (RF) signal to an RF waveguide cavity coupling the RF signal to a crystal resonator. The crystal resonator comprises a nonlinear material generating an optical output in response to a nonlinear interaction between the RF signal and an optical pump in the resonator. An optical port coupled to the crystal resonator for outputting the optical output from which the RF signal received on the antenna can be determined.

22 Claims, 9 Drawing Sheets

(56) References Cited

OTHER PUBLICATIONS

Benter, N.; Bertram, R.P.; Soergel, E.; Buse, K.; Apitz, D.; Jacobsen, L.B.; Johansen, P.M. Large-area Fabry-Perot modulator based on electro-optic polymers. Appl. Opt. 2005, 44, 6235-6239.
Bortnik, B.; Hung, Y.C.; Tazawa, H.; Seo, B.J.; Luo, J.; Jen, A.K.Y.; Steier, W.H.; Fetterman, H.R. Electrooptic Polymer Ring Resonator Modulation up to 165 GHz. J. Sel. T. Q. El. 2007, 13, 104-110.
Zhu, N.; Zhang, X.; Zhang, X.; Han, X.; Han, X.; Zou, C.L.; Zou, C.L.; Zhong, C.; Zhong, C.; Wang, C.H.; Wang, C.H.; Jiang, L.; Jiang, L.; Tang, H.X. Waveguide Cavity Optomagnonics for Microwave-to-Optics Conversion. Optica, Optica 2020, 7, 1291-1297.
Breunig, I.; Sturman, B.; Sedlmeir, F.; Schwefel, H.G.L.; Buse, K. Whispering gallery modes at the rim of an axisymmetric optical resonator: analytical versus numerical description and comparison with experiment. Opt. Expr. 2013, 21, 30683-30692.
Cohen, D.A.; Hossein-Zadeh, M.; Levi, A.F.J. High-Q microphotonic electro-optic modulator. Solid-St. El. 2001, 45, 1577-1589.
Cohen, D.A.; Hossein-Zadeh, M.; Levi, A.F.J. Microphotonic modulator for microwave receiver. Electron. Lett. 2001, 37, 300-301(1).
Cohen, D.A.; Levi, A.F.J. Microphotonic components for a mm-wave receiver. Solid-St. El. 2001, 45, 495-505.
Cohen, D.A.; Levi, A.F.J. Microphotonic millimetre-wave receiver architecture. Electron. Lett. 2001, 37, 37-39(2).
Demchenko, Y.A.; Gorodetsky, M.L. Analytical estimates of eigenfrequencies, dispersion, and field distribution in whispering gallery resonators. JOSA B 2013, 30, 3056-3063.
Forsch, M.; Stockill, R.; Wallucks, A.; Marinković, I.; Gärtner, C.; Norte, R.A.; van Otten, F.; Fiore, A.; Srinivasan, K.; Gröblacher, S. Microwave-to-Optics Conversion Using a Mechanical Oscillator in Its Quantum Ground State. Nat. Phys. 2020, 16, 69-74.
Gheorma, I.L.; Osgood, R.M., J. Fundamental limitations of optical resonator based highspeed EO modulators. Phot. Techn. Lett. 2002, 14, 795-797.
Gordon, E.I.; Rigden, J.D. The Fabry-Perot Electrooptic Modulator. Bell System Tech. J. 1963, 42, 155-179.
Hease, W.; Rueda, A.; Sahu, R.; Wulf, M.; Arnold, G.; Schwefel, H.G.; Fink, J.M. Bidirectional Electro-Optic Wavelength Conversion in the Quantum Ground State. PRX Quantum 2020, 1,020315.
Ho, K.P.; Kahn, J. Optical frequency comb generator using phase modulation in amplified circulating loop. Phot. Tech. Lett. 1993, 5, 721-725.
Hossein-Zadeh, M.; Levi, A. 14.6-GHz LiNbO3 microdisk photonic self-homodyne RF receiver. Microwave Theory and Techniques, IEEE Transactions on 2006, 54, 821-831.
Hossein-Zadeh, M.; Levi, A. Self-homodyne RF-optical LiNbO3 microdisk receiver. Solid-St. El. 2005, 49, 1428-1434.
Hou, A.Y.; Kakar, R.K.; Neeck, S.; Azarbarzin, A.A.; Kummerow, C.D.; Kojima, M.; Oki, R.; Nakamura, K.; Iguchi, T. The Global Precipitation Measurement Mission. Bulletin of the American Meteorological Society 2014, 95, 701-722. doi:10.1175/BAMS-D-13-00164.1.
Ilchenko, V.; Matsko, A.; Solomatine, I.; Savchenkov, A.; Seidel, D.; Maleki, L. K K_a Band All-Resonant Photonic Microwave Receiver. Phot. Tech. Lett. 2008, 20, 1600-1612.
Ilchenko, V.; Savchenkov, A.; Matsko, A.; Maleki, L. Sub-microwatt photonic microwave receiver. Phot. Tech. Lett. 2002, 14, 1602-1604.
Ilchenko, V.S.; Maleki, L. Novel whispering-gallery resonators for lasers, modulators, and sensors. Proc. SPIE 2001, 4270, 120-130.
Ilchenko, V.S.; Savchenkov, A.A.; Matsko, A.B.; Maleki, L. Whispering-gallery-mode electrooptic modulator and photonic microwave receiver. JOSA B 2003, 20, 333-341.
Ilchenko, V.S.; Yao, X.S.; Maleki, L. Microsphere integration in active and passive photonics devices. Proc. SPIE 2000, 3930, 154-162.
Kato, M.; Fujiura, K.; Kurihara, T. Generation of a superstable Lorentzian pulse train with a high repetition frequency based on a Fabry-Perot resonator integrated with an electro-optic phase modulator. Appl. Opt. 2005, 44, 1263-1269.
Kato, M.; Fujiura, K.; Kurihara, T. Generation of super-stable 40GHz pulses from Fabry-Perot resonator integrated with electro-optic phase modulator. Electron. Lett. 2004, 40, 299-301.
Kawanishi, T.; Oikawa, S.; Higuma, K.; Matsuo, Y.; Izutsu, M. LiNbO3 resonant-type optical modulator with double-stub structure. Electron. Lett. 2001, 37, 1244-1246.
Kummerow, C.; Barnes, W.; Kozu, T.; Shiue, J.; Simpson, J. The Tropical Rainfall Measuring Mission (TRMM) Sensor Package. Journal of Atmospheric and Oceanic Technology 1998, 15, 809 817. doi:10.1175/1520-0426(1998) 015<0809:TTRMMT>2.0.CO;2.
Lim, H.H.; Kurimura, S.; Katagai, T.; Shoji, I. Temperature-Dependent Sellmeier Equation for Refractive Index of 1.0Mol% Mg-Doped Stoichiometric Lithium Tantalate. Jpn. J. Appl. Phys. 2013, 52, 032601.
Matsko, A.B.; Savchenkov, A.A.; Ilchenko, V.S.; Seidel, D.; Maleki, L. On the Sensitivity of All-Dielectric Microwave Photonic Receivers. J. Lightwave Tech. 2010, 28, 3427-3438.
Matsko, A.B.; Strekalov, D.V.; Yu, N. Sensitivity of terahertz photonic receivers. Phys. Rev. A 2008, 77, 043812.
Rabiei, P.; Steier, W.H.; Zhang, C.; Dalton, L.R. Polymer Micro-Ring Filters and Modulators. J. Lightwave Tech. 2002, 20, 1968.
Rueda, A.; Sedlmeir, F.; Collodo, M.C.; Vogl, U.; Stiller, B.; Schunk, G.; Strekalov, D.V.; Marquardt, C.; Fink, J.M.; Painter, O.; Leuchs, G.; Schwefel, H.G.L. Efficient microwave to optical photon conversion: an electro-optical realization. Optica 2016, 3, 597-604.
Santamaria Botello, G.; Sedlmeir, F.; Rueda, A.; Abdalmalak, K.A.; Brown, E.R.; Leuchs, G.; Preu, S.; Segovia-Vargas, D.; Strekalov, D.V.; García Muñoz, L.E.; Schwefel, H.G.L. Sensitivity Limits of Millimeter-Wave Photonic Radiometers Based on Efficient Electro-Optic Upconverters. Optica 2018, 5, 12101219.
Santamaría-Botello, G.; Popovic, Z.; Abdalmalak, K.A.; Segovia-Vargas, D.; Brown, E.R.; García Muñoz, L.E. Sensitivity and Noise in THz Electro-Optic Upconversion Radiometers. Scientific Reports 2020, 10, 9403.
Savchenkov, A.A.; Ilchenko, V.S.; Liang, W.; Eliyahu, D.; Matsko, A.B.; Seidel, D.; Maleki, L. Voltage-controlled photonic oscillator. Opt. Lett. 2010, 35, 1572-1574.
Savchenkov, A.A.; Liang, W.; Ilchenko, V.S.; Dale, E.; Savchenkova, E.A.; Matsko, A.B.; Seidel, D.; Maleki, L. Photonic E-field sensor. AIP Advances 2014, 4, 122901.
Savchenkov, A.A.; Liang, W.; Matsko, A.B.; Ilchenko, V.S.; Seidel, D.; Maleki, L. Tunable optical single-sideband modulator with complete sideband suppression. Opt. Lett. 2009, 34, 1300-1302.
Schermer, R.T.; Stievater, T.H. Millimeter-Wave Dielectric Properties of Highly Refractive Single Crystals Characterized by Waveguide Cavity Resonance. IEEE Transactions on Microwave Theory and Techniques 2019, 67, 1078-1087. doi:10.1109/TMTT.2018.2883107.
Stephens, G.L.; Vane, D.G.; Boain, R.J.; Mace, G.G.; Sassen, K.; Wang, Z.; Illingworth, A.J.; O'connor, E.J.; Rossow, W.B.; Durden, S.L.; Miller, S.D.; Austin, R.T.; Benedetti, A.; Mitrescu, C. The Cloudsat Mission and the A-Train: A New Dimension of Space-Based Observations of Clouds and Precipitation. Bulletin of the American Meteorological Society 2002, 83, 1771-1790. doi:10.1175/BAMS-83-12-1771.
Strekalov, D.V.; Savchenkov, A.A.; Matsko, A.B.; Yu, N. Efficient upconversion of subterahertz radiation in a high-Q whispering gallery resonator. Opt. Lett. 2009, 34, 713-715.
Strekalov, D.V.; Schwefel, H.G.L.; Savchenkov, A.A.; Matsko, A.B.; Wang, L.J.; Yu, N. Microwave whispering-gallery resonator for efficient optical up-conversion. Phys. Rev. A 2009, 80,033810.
Tanelli, S.; Durden, S.L.; Im, E.; Pak, K.S.; Reinke, D.G.; Partain, P.; Haynes, J.M.; Marchand, R.T. CloudSat's Cloud Profiling Radar After Two Years in Orbit: Performance, Calibration, and Processing. IEEE Transactions on Geoscience and Remote Sensing 2008, 46, 3560-3573. doi: 10.1109/TGRS.2008.2002030.
Tanelli, S.; Haddad, Z.S.; Im, E.; Durden, S.L.; Sy, O.O.; Peral, E.; Sadowy, G.A.; SanchezBarbetty, M. Radar concepts for the next generation of spacebome observations of cloud and precipitation processes. 2018 IEEE Radar Conference (RadarConf18), 2018, pp. 1245-1249. doi: 10.1109/RADAR.2018.8378741.

(56) References Cited

OTHER PUBLICATIONS

Tazawa, H.; Kuo, Y.H.; Dunayevskiy, I.; Luo, J.; Jen, A.K.Y.; Fetterman, H.R.; Steier, W.H. Ring Resonator-Based Electrooptic Polymer Traveling-Wave Modulator. J. Lightwave Tech. 2006, 24, 3514-3519.
Tazawa, H.; Steier, W. Linearity of ring resonator-based electro-optic polymer modulator. Electron. Lett. 2005, 41, 1297-1298(1).
Tazawa, H.; Steier, W.H. Analysis of ring resonator-based traveling-wave modulators. Phot. Techn. Lett. 2006, 18, 211-213.
Weldon, M.; Hum, S.; Davies, R.; Okoniewski, M. Traveling-wave ring circuit for resonant enhancement of electrooptic modulators. Phot. Tech. Lett. 2004, 16, 1295-1297.
Xu, Y.; Sayem, A.A.; Fan, L.; Zou, C.L.; Wang, S.; Cheng, R.; Fu, W.; Yang, L.; Xu, M.; Tang, H.X. Bidirectional Interconversion of Microwave and Light with Thin-Film Lithium Niobate. Nat Commun 2021, 12, 4453.

* cited by examiner

NEAR-FIELD COUPLER FOR A HIGHLY EFFICIENT AND COMPACT RF-PHOTONIC RECEIVER WITH APPLICATIONS IN SPACEBORNE RADARS

CROSS REFERENCE TO RELATED APPLICATIONS

This application claims the benefit under 35 U.S.C. Section 119(e) of U.S. Provisional Application No. 63/432,898, filed Dec. 15, 2022, by Dmitry Strekalov, Ninoslav Majurec, Andrey Matsko, Vladimir Ilchenko, and Razi Ahmed, entitled "NEAR-FIELD COUPLER FOR A HIGHLY EFFICIENT AND COMPACT RF-PHOTONIC RECEIVER WITH APPLICATIONS IN SPACEBORNE RADARS," which application is incorporated by reference herein.

STATEMENT REGARDING FEDERALLY SPONSORED RESEARCH AND DEVELOPMENT

This invention was made with government support under Grant No. 80NMO0018D0004 awarded by NASA (JPL). The government has certain rights in the invention.

BACKGROUND OF THE INVENTION

1. Field of the Invention

The present disclosure relates to RF receivers and methods of making the same.

2. Description of the Related Art

W-band (94 GHz) spaceborne radars have served and continue to serve as critical means of measuring the Earth's various natural phenomenon. Their part in understanding Earth's climate and weather patterns, for instance, is well documented. Trailblazing missions such as the Tropical Rainfall Measuring Mission (TRMM) [1], CloudSat [2,3], and Global Precipitation Measurement (GPM) [4] have demonstrated the central role of cloud and precipitation radars in this context. Ground breaking improvements in weather and climate models have resulted from research based on data collected by these instruments. However, frequent observations (on the order of seconds to minutes) necessary to measure the rapid evolution of phenomenon such as weather have not been possible so far.

The first generation of spaceborne cloud and precipitation radar systems had a limitation related to their size weight and power (SWaP). These instruments were implemented only in single units and were unable to cover the rapid temporal evolution of weather systems from low Earth orbit. So far this function has been limited to lower resolution passive microwave and visible/infra-red sensors. Recent studies pertaining to cloud science and its global observation from space are focusing their attention on compact W-band radar systems [5] as key elements of their complement of instruments, as they can be implemented and deployed with either reduced cost or in larger numbers. What is needed however, are compact, W-band radars to observe clouds at sufficient spatial (vertical and horizontal) and temporal resolution. The present disclosure satisfies this need.

SUMMARY OF THE INVENTION

A receiver comprising a waveguide interface to an antenna guiding a radio frequency (RF) signal to an RF waveguide cavity and coupling the RF signal (received on the antenna) to a crystal resonator. The crystal resonator comprises a nonlinear material generating an optical output in response to a nonlinear interaction between the RF signal and an optical pump incident on the crystal resonator. An optical port coupled to the crystal resonator outputs the optical output to a detection system and the detection system extracts the RF signal from the optical output.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

Figure 1:
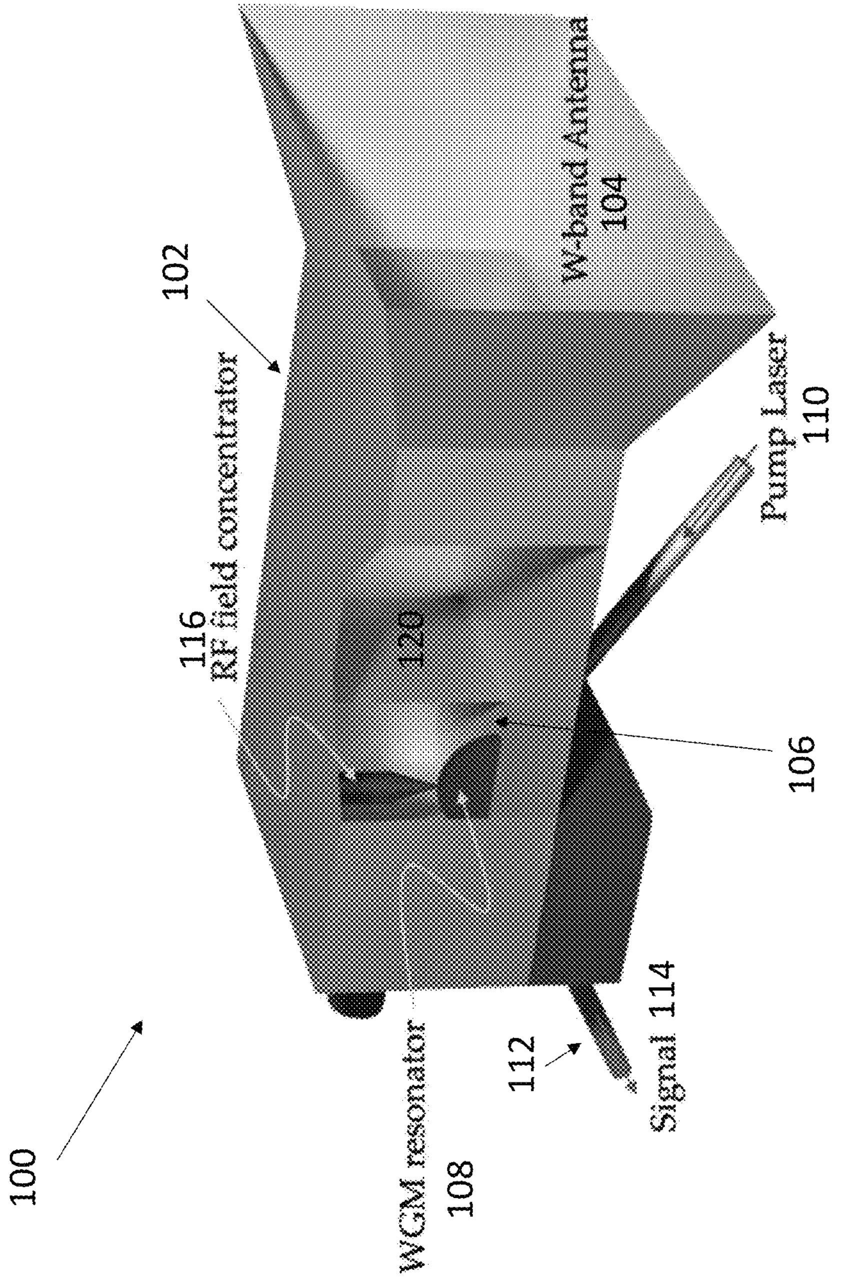
FIG. 1. Conceptual design of the W-band microwave photonic receiver. A WGM resonator is interrogated by coherent light. A signal of interest enters the horn antenna and propagates to the WGM resonator reaching high intensity in the vicinity of the resonator surface due to a special configuration of RF field concentrator electrodes. Due to the electro-optical effect the signal is upconverted to the optical frequency domain and leaves the resonator through the optical port. The signal is subsequently optically processed and downconverted to the IF domain (not shown in the diagram).

FIG. 1 illustrates an example of a receiver (or device 100 useful as a receiver) comprising a waveguide interface 102 to an antenna 104 configured to guide an RF signal (received on the antenna) to an RF waveguide cavity 106 coupling the RF signal to a crystal resonator 108.

The crystal resonator comprises a nonlinear material generating an optical output signal in response to a nonlinear interaction between the RF signal and an optical pump 110 in the crystal resonator. During operation, a mode of the crystal resonator 108 is interrogated optically via the optical pump and the electric field of the RF signal generates an optical harmonic detuned from the optical pump by the frequency of the RF signal but also matching the frequency of another optical mode of the crystal resonator.

An optical port 112 coupled to the crystal resonator outputs the optical output signal 114 comprising the optical harmonic propagating with the light leaving the resonator. The optical output can be converted to an intermediate frequency (IF) by mixing the light with a local oscillator (LO) field on a fast photodiode so as to extract the RF signal as a beat signal.

Example: WGM Resonator Coupled to a Horn Antenna

The nonlinear interaction can be greatly enhanced when the geometrical distributions of the RF and optical fields properly overlap. The following sections describe embodiments In this example, the crystal resonator 108 comprises a transverse electric (TE) and transverse magnetic (TM) whispering gallery mode (WGM) resonator, wherein the frequency difference between the modes of the WGM is matched to the frequency of the RF signal, e.g., by tuning with temperature or DC voltage applied to the resonator. Further enhancement of the nonlinear interaction can be achieved by optimal shaping of an electrode 116 integrated with the waveguide.

In a resonator fabricated from a birefringent optical crystal (such as lithium niobate or lithium tantalate), wherein the optical axis is also the resonator axis of symmetry, the TE-polarized light "sees" predominantly the extraordinary index of refraction $n_e$ while the TM-polarized light "sees" predominantly the ordinary index of refraction $n_0$. These two indices have different temperature dependencies, and also different dependencies on the external DC electric field. Therefore, manipulating these parameters tunes the TE and TM WGMs frequencies relative to each other, achieving the desired frequency detuning.

a. Theoretical Model Used for Simulations of the Performance

The interaction energy of optical TE and TM WGMs fields $\vec{E}_{TE}$ and $\vec{E}_{TM}$, and the electric field of the RF signal under study $\vec{E}_{RF}$, can be presented as the following volume integral [46]:

$$\mathcal{E} = \frac{n_e^2 n_o^2}{4\pi}\int_V r_{51}\left(\vec{E}_{TM}\cdot\vec{E}_{RF}\right)E_{TE}dV \quad (1)$$

where $\vec{E}_{TE}=\hat{z}E_{TE}$ and $\vec{E}_{TM}=\hat{\rho}E_{TM}$, $\hat{z}$ and $\hat{\rho}$ being the unit vector in the optical axis direction and its perpendicular. The interaction mediated by the electro-optic tensor elements $r_{42}=r_{51}$ requires the RF field to have a radial component and we assume $\vec{E}_{RF}=\hat{\rho}E_{RF}$ Adopting the rotated-wave picture, the interaction Hamiltonian for single side-band modulation is as follows:

$$\hat{H}_{int} = \hbar g \hat{a}_{TE}\hat{a}_{TM}^{\dagger} + h.c., \quad (2)$$

when the electric field is represented as an excitation of an optical mode represented through the photon's creation and annihilation operators $a^{\dagger}$ and a and where the coupling constant g is $$g = n_0 n_e r_{51}\sqrt{\omega_{TE}\omega_{TM}}\int_V \Psi_{TE}^*(\vec{r})\Psi_{TM}^*(\vec{r})E_{RF}(\vec{r})\,dV \approx n_0 n_e r_{51}\frac{2\pi c}{\lambda}\int_V \Psi_{TE}^*(\vec{r})\Psi_{TM}(\vec{r})E_{RF}(\vec{r})dV$$

where $\lambda_{TE}\approx\Delta_{TM}=\lambda$ is the optical wavelength in vacuum and $$\Psi_{TE}^*(\vec{r})$$

and $$\Psi_{TM}(\vec{r})$$

are the TE and TM WGM eigenfunctions, respectively having analytical approximations available from in the form:

$$\Psi(\chi, \xi, \phi) \propto e^{im\phi}e^{-\xi^2/2}H_{L-m}(\xi)Ai(\chi-\alpha_q) \quad (3)$$

where $H_{L-m}(\xi)$ is a Herimitian polynomial, Ai $(\chi)$ is the Airy function which has positive-valued zeros $\alpha_q$, i.e. Ai $(-\alpha_q)=0$ for q=1, 2, . . . The scaled coordinates $\chi$ and $\xi$ are defined as $$\chi \approx 2^{1/3}m^{2/3}\frac{w}{R},\ \xi = \sqrt{m}\left(\frac{R}{\rho}\right)^{1/4}\theta, \quad (4)$$

where R and $\rho$ are the resonator radius and the local curvature of its rim, respectively. The angle $\theta$ is measured along the rim curvature starting from the equator, and the coordinate w is measured from the resonator surface towards the center of the rim curvature. The WGM numbers are the L, m, q. For the best conversion efficiency we need to find such WGMs that L=m (which makes $H_{L-m}(\xi)=1$) and q=1 both for the optical pump and signal. The remaining mode number can be estimated from the resonator size and the optical wavelength: $m\approx 2\pi nR/A$, so the scaled coordinates (8) can be written in a form $$\chi \approx 2\left(\frac{\pi n}{\lambda}\right)^{2/3}R^{-1/3}w,\ \xi = \sqrt{2\pi n\frac{R}{\lambda}}\left(\frac{R}{\rho}\right)^{1/4}\theta \quad (5)$$

$w_0$ is the depth of the Airy function maximum:

$$w_0 \approx 0.308\left(\frac{R\lambda^2}{n^2}\right)^{1/3} \quad (6)$$

Using these approximations, the coupling/conversion rate can be rewritten as:

$$g \approx n_0 n_e r_{51} \frac{c}{\lambda} \int_{-\pi}^{\pi} \cos(\Delta m\phi) E_{RF}(w_0, 0, \phi) d\phi. \quad (7)$$

The conversion rate g is the key parameter determining the system's performance and can be used to obtain the photonic gain G of the photonic system when the RF signal is measured by mixing the optical modulation sideband with a local oscillator field on a balanced fast photodiode, and measuring the power of the beat note RF signal. This power is found as $$P_{RF\,out} = \rho\mathcal{R}^2 P_0 P_{LO} \eta_S = \rho\mathcal{R}^2 P_0 P_{LO} \frac{4g^2}{\gamma a \gamma b}, \quad (8)$$

where $\gamma_{a,b}$ are total losses for the optical modes, $\mathcal{R}$ is the responsivity of the fast photodiode in A/W, and ρ is the resistance of the RF circuit interfacing the photodiode. It can be related to the W-band signal power $P_{RF}$ in supplied to the waveguide by introducing a photonic gain G as $$G = \frac{P_{RF\,out}}{P_{RF\,in}} = \rho\mathcal{R}^2 P_0 P_{LO} \frac{4g_0^2}{\gamma_a \gamma_b \alpha_W} \quad (9)$$

where the normalized coupling rate $$g_0 = \frac{g}{E_0} \quad (10)$$

and $E_0 = E_{RF}$ ($w_0$, 0,0) is the peak value of the RF field corresponding to the W-band signal power $$P_{RF}\ \text{in} = \alpha_W E_0^2$$

through an empirical coefficient $\alpha_W$ which can be found from the HFSS simulation.

The chosen optical and RF electric fields orientations allow for TE-TM conversion, when the optical pump is coupled into a TE mode of the resonator and the signal is generated in a TM mode; and the TM-TE conversion, when the pump is coupled into a TM mode and the signal is generated in a TE mode. Both options are equivalent in terms of the conversion efficiency, however usually a higher circulating power can be afforded in the TE modes before the thermorefractive and photorefractive effects becomes too strong. Therefore the TE modes are more suitable as the pump modes and TE-TM type of conversion is considered in the following analysis.

Both TE and TM modes' eigenfrequencies are related to the mode numbers via the WGM dispersion equations [48]. These equations include the indices of refraction that themselves depend on the optical frequencies so that the transcendental equations need to be solved numerically. A goal of the numerical solution is to find a pair of the TE (pump) and TM (signal) modes wherein the pump mode frequency matches the frequency of the laser, and the signal mode frequency is higher than the pump frequency by exactly the frequency of the expected RF signal (at 94.05 GHz). This enables the anti-Stokes (up-converting) signal generation process, which is preferred over the Stokes (downconverting) process, because the latter is prone to spontaneous generation of the optical signal even without the RF input.

b. Frequency Matching by Temperature Tuning

The frequency-matching problem can be solved for discrete TE and TM WGM spectra using temperature tuning of the dispersion equations, achieved via the thermorefractivity. An approach comprises the following steps:

1. Finding a pump (TE) mode nearest to the nominal pump wavelength λ=1558.6 nm at the nominal resonator temperature $T_0$=35° C. This mode has a frequency $f_p$ which is no further from the nominal pump frequency than the resonator free spectral range (FSR). We assume that it can be accessed with a minimal tuning of the laser wavelength.
2. Finding a signal (TM) mode nearest to the target frequency $$f_s^{(0)} = f_p + f_{RF}$$

and determining this mode's frequency $f_s$.

3. Evaluating the RF frequency detuning of the found modes from the target RF signal frequency $$\Delta f = f_s - f_s^{(0)}$$

and keeping the solution if the detuning falls into a specified frequency range which is deemed accessible.

Figure 2:
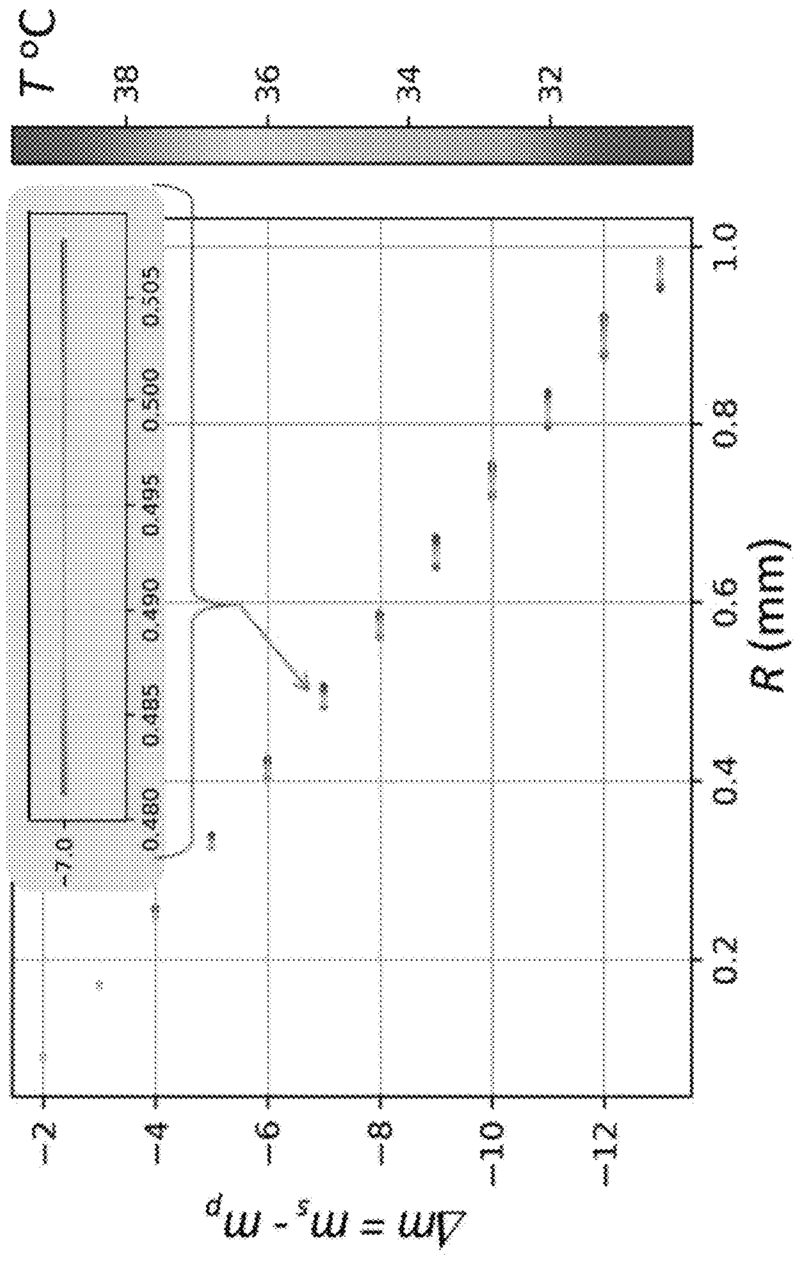
FIG. 2. WGMs with different relative orbital numbers can be used for the 94.05 GHz RF signal upconversion in a TE-TM anti-Stokes process in Lithium Tantalate resonators of different radii at different temperatures.

The accessible RF frequency range is established based on the differential thermorefractivity $dn_0/dT - dn_e/dT$ and a reasonable range of the resonator temperature $T_0 \pm \Delta T$. FIG. 2 plots the $\Delta m = m_{TE} - m_{TM}$, assuming $T_0$=35° C. and ΔT=5° C. for different sized WGM resonators. The temperature indicated by the color color bar corresponds to achieving the desired microwave frequency $f_s - f_p = f_{RF}$ in a resonator of given radius.

FIG. 2 shows that a larger resonator allows for a larger radius uncertainty for fixed temperature range. In practice, limited fabrication precision of the resonators leads to a few microns uncertainty in the radius value. Therefore a large radius tolerance is advantageous for resonator fabrication, although it implies the need for tighter temperature control in larger resonators.

The wavelength and temperature dependence of the indices of refraction depend on the crystal composition, which adds to the fabrication uncertainty. In this analysis, the Sellmeier equation are used for nominally pure Lithium Tantalate from [49]. Using the Sellmeier equation for 1.0 mol % MgO-Doped stoichiometric Lithium Tantalate from [50], the Δm=−2 frequency matching solution remains viable for the resonator radius ranging form 0.35 to 0.9 mm. That is the range sparsely populated by Δm=−12 to Δm=−5 solutions in FIG. 2.

The large discrepancy which may be caused by the variation of the refractive properties among different samples does not significantly affect the performance of the receiver and only impacts the ability to find the desired pair of modes. However, tuning additional degrees of freedom such as the laser wavelength (which can be tuned much further than by a single FSR) can be used to mitigate the fabrication and material-composition uncertainties.

c. Signal to Noise Calculations

Figure 3:
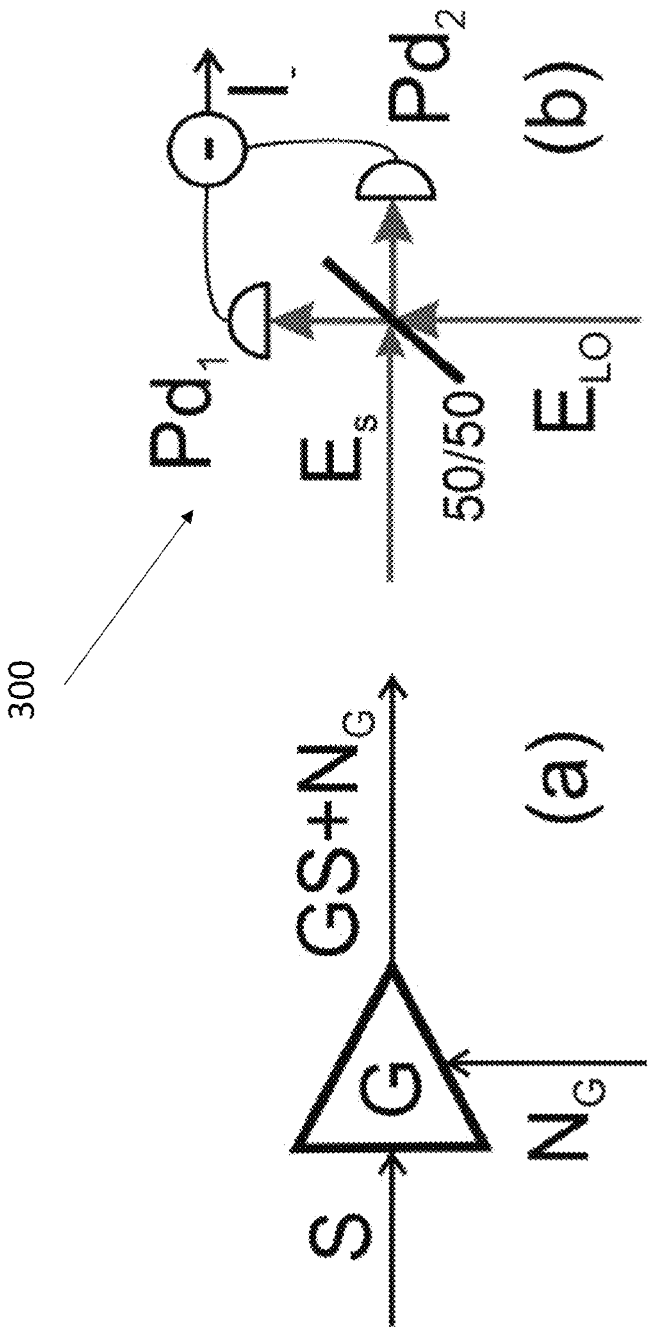
FIG. 3. (a) Schematic of the receiver. The signal from antenna goes through the photonic circuit that changes the magnitude of the signal and also adds noise associated with the temperature of the electronic circuit. (b) Schematic of the homodyne detection scheme involving a balanced photodiode.

Signal-to-noise ratio of the receiver is calculated by representing the receiver as the photonic circuit shown in FIG. 3*a*, wherein the signal (S) from the antenna amplified or attenuated by the photonic circuit by the gain factor G. The circuit also adds noise $N_G$ comprising Johnson-Nyquist and optical (shot and intensity) noise.

The scheme of FIG. 3*b* is used to analyze the noise. The photo current in photodiodes $Pd_{1,2}$ can be written in form $$i_1 = \mathcal{R}(E_S + E_{LO})^2/2,$$

$$i_2 = \mathcal{R}(E_S - E_{LO})^2/2$$

where $\mathcal{R}$ is the photodiode responsivity in A/W, $$E_S = \sqrt{P_S}\, e^{i\phi_s} \text{ and } E_{LO} = \sqrt{P_{LO}}\, e^{i\phi_{LO}}, P_S$$

and $P_{LO}$ are the power values for the signal and the local oscillator, respectively, $\phi_S$ and $\phi_{LO}$ are their phases. The differential current is $$i_- = 2\mathcal{R}E_{LO}E_S.$$

From this expression, and for the case of a weak signal, the noise of the local oscillator does not contribute to the noise of the differential current since the expectation value of the signal is small. At the output of the receiver:

$$S_{out} = 4\rho\mathcal{R}^2 P_{LO}P_S = 4\rho\mathcal{R}^2 P_0 P_{LO}\frac{4g_0^2}{\gamma_a\gamma_b\alpha_W}P_{RF\,in} = 4GP_{RF\,in}$$

$$N_{out} = N_G = \left[k_B T_{rec} + 2\hbar\omega\rho\mathcal{R}^2 P_{LO}\right]\Delta F$$

where ΔF is the reception bandwidth (which is always smaller than the bandwidth of the WGM coupled to the modulation sideband and the bandwidth of the RF resonator), while $T_{rec}$ is the receiver ambient temperature. Compared with a single photodiode, the balanced detection increases the signal by 4 times, and noise by 2 times. The minimal signal that can be detected is, therefore, defined as $$\frac{P_{RFmin}}{\Delta F} = \frac{k_B T_{rec}}{G} + \frac{\gamma_a\gamma_b\alpha_W}{4g_0^2}\frac{\hbar\omega}{2P_0}$$

G must be greater than 1 to have a lower than ambient receiver noise temperature. The shot noise can be made small for sufficiently large $P_0$.

d. RF Simulations and Results

Figure 4:
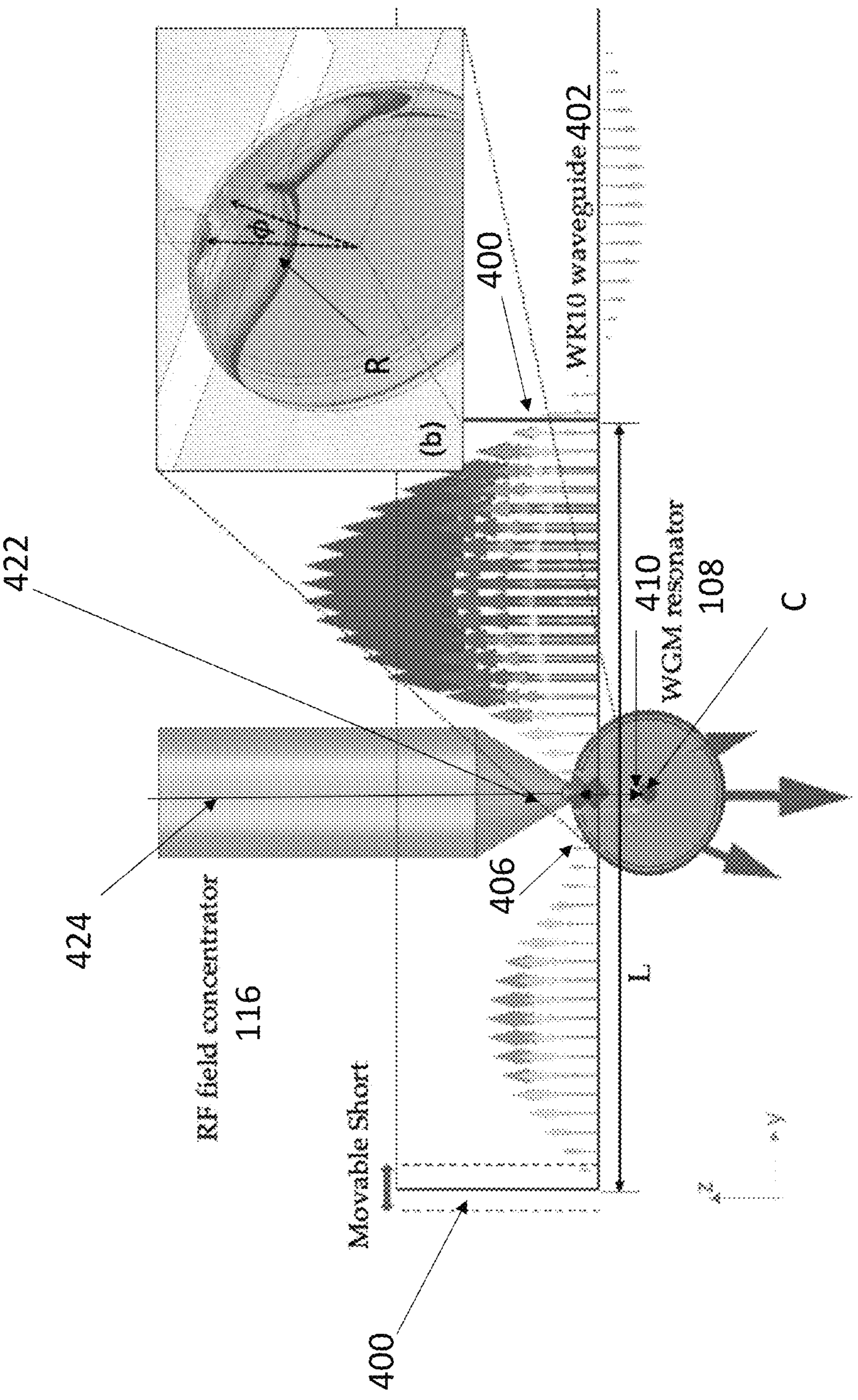
FIG. 4. Structural model of the resonant section of the electro-optical transducer in HFSS with the WGM resonator and RF-field concentrator post. The wave-port excitation is to the right of the structure and the movable short is modeled as a PEC to the left. Also shown are simulated E-field vectors with, crucially, the strongest field vector pointed radially towards the center of the WGM resonator. The inset (b) shows distribution of the simulated field inside the resonator.

To assess the performance of the electro-optical transducer a combination of detailed electromagnetic simulations using HFSS to estimate $E_{RF}(\vec{r})$ at W-band, and analytical models of optical WGM eigenfunctions, $\Psi_{TE,TM}(\vec{r})$ were used in the theoretical model outlined above. FIG. 4 illustrate the simulated resonant modulator structure, with the RF concentrator post and the WGM resonator situated inside the standard WR10 (2.54 mm×1.27 mm) waveguide section with the waveguide walls treated as perfect electric conductors (PEC).

A resonant waveguide cavity of length L is created inside the waveguide using a movable short (shown on the left of the structure in FIG. 4) and an H-plane inductive diaphragm located to the right, both treated as PEC plates. The RF-field concentrator is a cylindrical metal post that tapers to the WGM resonator. The resonator, centered at the origin oriented so that its rim lies in the yz-plane, protrudes into the waveguide structure and is modeled as a dielectric structure with a tensor permittivity $\tilde{\varepsilon}_r$ matching that of $LiTaO_3$ [51]. The HFSS simulated E-fields, based on an excitation port to the right in FIG. 4 (not shown), is plotted as the vectors with their height representing relative field strength. Of note is the high field strength directed towards the center of the WGM resonator and the relatively high field concentration inside the resonant cavity section. The distribution of the field inside the WGM resonator is shown in FIG. 4 inset (b), with the RF energy concentrated in a small region around the tip of the field-concentrator post as desired.

Figure 5:
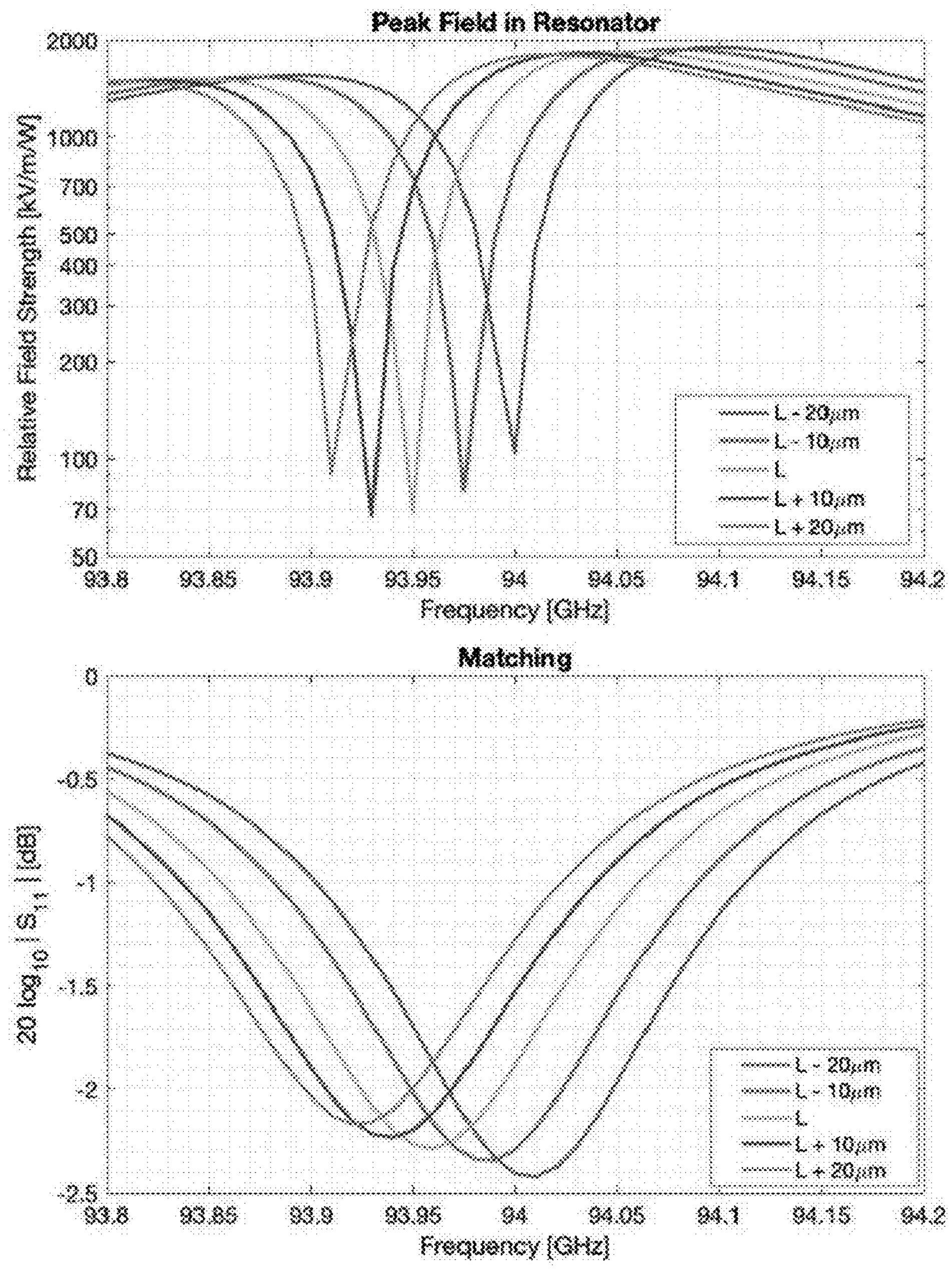
FIG. 5. Simulated relative field strength approximately 2 μm inside the WGM receiver as a function of frequency for various positions of the matching stub. The field strength is described relative to the power (in Watts) at the input. Also shown is the matching, $S_{11}$ of the resonant modulator.

FIG. 5 shows the peak relative field strength, 2 μm inside the WGM resonator as a function of RF frequency centered around 94.05 GHz. Field strength is displayed in units of kV/m relative to an excitation power of 1 W. The fields are plotted at a depth of 2 μm below the resonator rim since the optical radial window function peaks at that depth, thus most directly impacting the electro-optic coupling rate, g and the photonic gain G. Also shown in FIG. 5 is the sensitivity of the peak field to the length of the resonant cavity, L, which is equivalent to moving the shorting stub relative to its nominal position. This allows the ability to tune the cavity length, L, and overcome fabrication tolerances.

The nominal structure was designed to have relative field strength peak of approximately 2000 kV/m/W at 94.05 GHz. Also shown in FIG. 5 is the matching, or $S_{11}$ of the resonant structure. As indicated by the theoretical model, the matching itself doesn't directly impact receiver performance, however, observed variation in $S_{11}$ is useful as a stand-in for field strength allowing us to tune the resonant structure using W-band measurements alone without requiring optical measurement infrastructure during preliminary testing.

Figure 6:
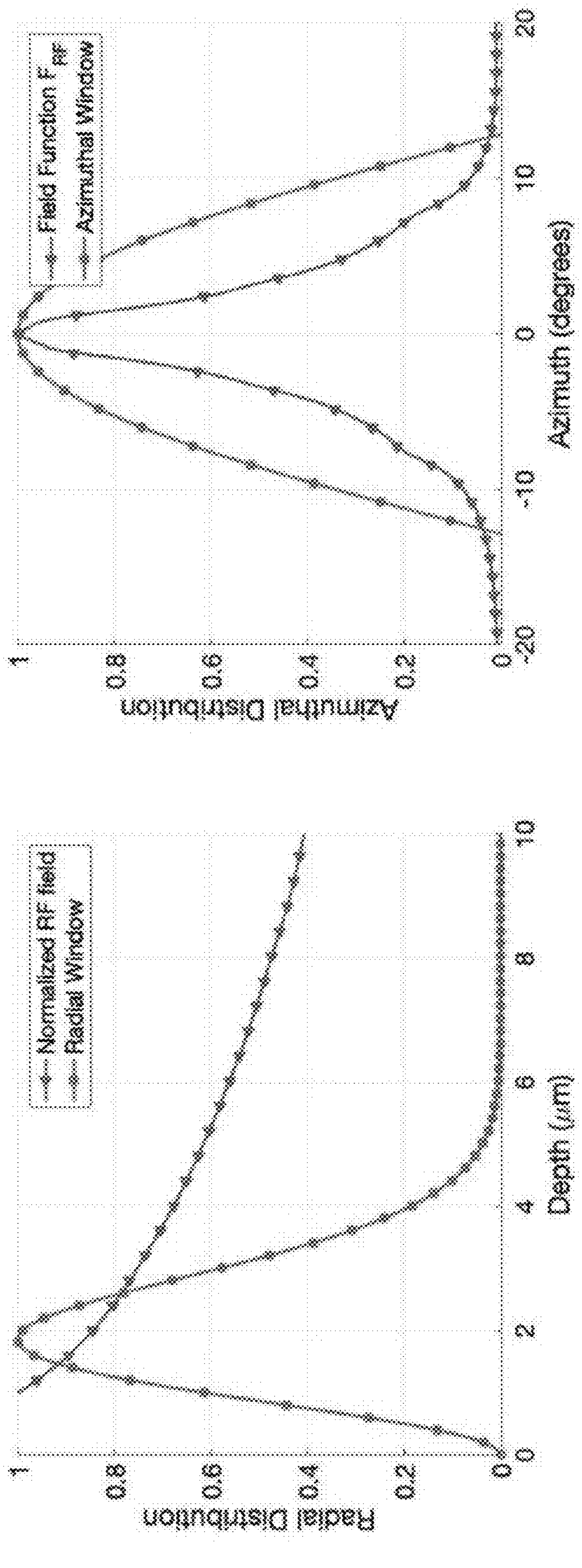
FIG. 6. Simulated RF field strength, and the radial window function vs. depth left). Simulated normalized RF field strength $F_{RF}(W_0, 0, \phi)$ evaluated at the optical WGM depth $w_0 \approx 2$ μm, and the azimuthal window function cos 7ϕ (right).

FIG. 6 shows the distribution of W-band fields inside the WGM resonator. These fields are concentrated around the tip of the post and dissipate outward. The left panel shows the radial distribution of the simulated RF field. Here the depth w is measured from the resonator surface inwards, in the equatorial plane of the resonator. Also shown is the radial window function $Ai^2(\chi-\alpha_1)$. The simulation shows that the approximation made to evaluate the RF field at the peak of the radial window function $w_0 \approx 2$ μm and then treated as a constant, is sufficiently accurate.

Similarly, the right panel shows the simulated azimuthal profile of $F_{RF}$ ($w_0$, 0, ϕ) as a function of the azimuth angle, ϕ, measured in the yz-plane clockwise from the z-axis. Also shown is the optical azimuth window function, cos (7ϕ) centered at ϕ=0. The optical azimuth window function is much wider than the simulated $F_{RF}$ ($w_0$, 0, ϕ) suggesting that the upconversion efficiency is mostly driven by the shape of RF fields.

TABLE 1

The list of parameters used in the numeric estimation of receiver performance

| | Symbol | Value | Units |
|---|---|---|---|
| **Parameter** | | | |
| Optical wavelength | $\lambda$ | 1558.6 | nm |
| Resonator radius | R | 490 | μm |
| Rim radius | r | 104 | μm |
| Ordinary refractive index | $n_o$ | 2.1189 | |
| Extraordinary refractive index | $n_e$ | 2.1231 | |
| Electro-optic coefficient | $r_{51}$ | 20 | pm/V |
| TM coupling rate | γTM | $2 \times 10^7$ | 1/s |
| TE coupling rate | γTE | $4 \times 10^8$ | 1/s |
| Pump power | $P_0$ | 10 | mW |
| LO power | $P_{LO}$ | 2 | mW |
| RF impedance | ρ | 50 | Ω |
| Photodiode responsivity | $\mathcal{R}$ | 0.9 | A/W |
| Differential mode number | Δm | 7 | |
| **Computed Performance** | | | |
| Peak field value | $E_0$ | 1800 | kV/m |
| RF coefficient | $\alpha_W$ | $3.1 \times 10^{-13}$ | $W(m/V)^2$ |
| Coupling rate | g | $3.91 \times 10^9$ | 1/s |
| Normalized coupling rate | $g_0$ | 2200 | m/(V s) |
| Photonic gain | G | 6.3 | |
| Shot noise | | $0.19 \times k_B T_{rec}$ | W/Hz |
| Receiver sensitivity | | $0.35 \times k_B T_{rec}$ | W/Hz |

Table 1 summarizes the parameters used to perform the HFSS simulation of the RF field. The simulations use an RF input power of 1 W, which is the power propagating from the far right end of the waveguide in FIG. 4 towards the resonator. The peak field value was found to be $E_0 \approx 1800$ kV/m, corresponding to $\alpha_W \approx 3.1 \times 10^{-13}$ $W(m/V)^2$. The azimuthal overlap integral for the expression of g in (7) is found by numerically multiplying and integrating the curves in the right panel of FIG. 6 to be approximately 226 kV/m. This yields $g \approx 3.91 \times 10^9$ 1/s and $g_0 \approx 2200$ m/(Vs). Using $\alpha_W$, $g_0$ and the parameters from Table 1, the shot noise contribution is found to equal $0.19 \times K_B T_{rec}$. From (18) we also find the photonic gain $G \approx 6.3$. Therefore the overall receiver sensitivity is limited at $0.35 \times K_B T_{rec}$.

Process Steps

Figure 7:
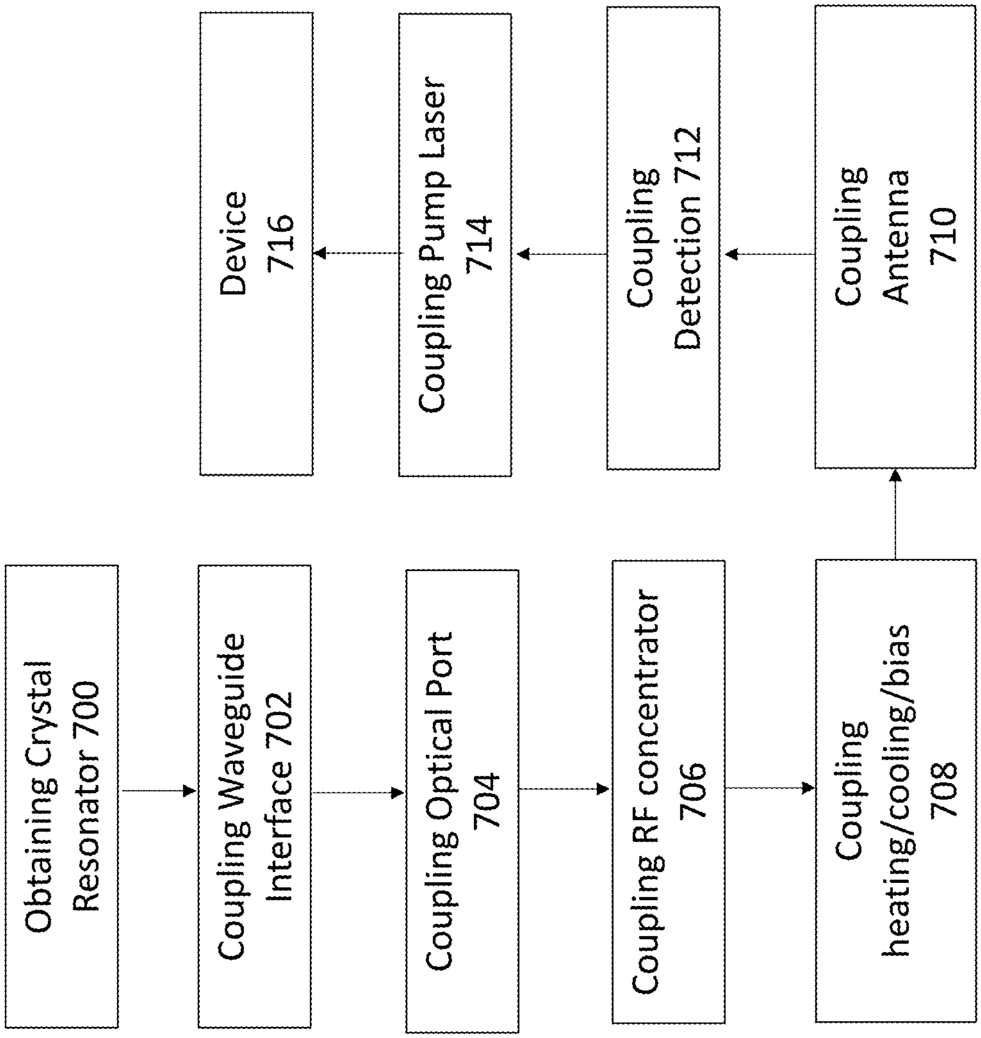
FIG. 7 is a flowchart illustrating a method of making the device.

FIG. 7 is a flowchart illustrating a method of making the device useful in a receiver (referring also to FIGS. 1-6).

Block 700 represents obtaining a crystal resonator comprising a nonlinear material and which has appropriate nonlinearity, optical transparency, and Q-factor/optical quality (e.g., by shaping) for generating an optical output in response to a nonlinear interaction between an RF signal and an optical pump in the resonator. Example materials include lithium tantalate, lithium niobate, and equivalents thereof. Example resonators include WGM resonators having a radius in a range of 0.2 mm-1 mm, for example.

Block 702 represents coupling a waveguide interface, comprising an RF waveguide cavity, to the crystal resonator. In one or more examples, the waveguide interface comprises a rectangular waveguide (402 in FIG. 4, e.g. a waveguide having a WR designation such as a WR10 waveguide) coupled to or comprising an RF waveguide cavity bounded by reflectors 400, 120 for the RF wave comprising the RF signal. In one or more examples, the reflectors 400, 120 (in FIG. 4 and FIG. 1 respectively) comprise perfect electric conducting (PEC) plates for the RF wave. In or more further examples, the reflectors comprise metal plates (e.g., brass, copper, aluminum, gold or silver). The reflectors can be optionally movable to tune a length of the cavity. In one or more examples the plates can comprise a plate or wall extending only partially across the hollow opening of the rectangular waveguide.

In typical examples, the RF waveguide comprises the resonant cavity having a length L to support a standing RF wave comprising the RF signal. The waveguide can be appropriately dimensioned (e.g., WR designation) to guide the wavelength of the RF signal received on the antenna.

Block 704 represents coupling an optical port (e.g., fiber coupled port) to the crystal resonator, for outputting the optical output from which the RF signal can be determined.

Block 706 represents optionally coupling an RF concentrator or electrode. In or more examples, the RF concentrator is positioned at a maximum of the electric field in the resonant cavity. In one or more examples, the RF concentrator comprises a metal or dielectric post comprising a tapered end that is coupled into the rim of the WGM resonator, so that the post has a longitudinal axis along the radius so as to concentrate the electric field of the RF signal along the radius. In one embodiment, the RF concentrator can be a copper rod with diameter of 0.8 mm with conical taper to 100 micron diameter flat tip at the end (dimensions related to embodiment of W-band 70-110 GHz described herein).

Block 708 represents optionally coupling a heating and/or cooling element and/or bias lines to the crystal resonator.

Block 710 represents optionally coupling the antenna.

Block 712 represents optionally coupling the detection system, e.g., comprising a photodiode and an input for LO signal (which can be split off from the optical pump) or the laser beam outputted from the laser generating the optical pump.

Block 714 represents optionally coupling the optical pump laser so that the optical pump is incident on the crystal resonator.

Block 716 represents the end result, the device. The device can be embodied in many ways, including but not limited to, the following (referring also to FIGS. 1-6).

1. A device 100 useful as a receiver, comprising:
   - a waveguide interface 102 to an antenna 104 guiding a radio frequency (RF) signal, received on the antenna, to an RF waveguide cavity 106 coupling the RF signal to a crystal resonator 108; wherein:
   - the crystal resonator 108 comprises a nonlinear material generating an optical output in response to a nonlinear interaction between the RF signal and an optical pump in the resonator; and
   - an optical port 112 coupled to the crystal resonator for outputting the optical output from which the (e.g., amplitude or phase of) the RF signal can be determined.
2. The device of embodiment 1, wherein the crystal resonator supports a pair of modes (e.g., but not limited to, TM and TE modes) separated in frequency by a frequency of the RF signal.
3. The device of embodiment 1 or 2, wherein the crystal resonator 108 comprises a whispering gallery mode (WGM) resonator.
4. The device of any of the embodiments 1-3, wherein the RF waveguide cavity comprises a resonant cavity bounded by reflectors 400 for an RF wave comprising the RF signal.
5. The device of any of the embodiments 1-4, wherein the crystal resonator comprises a rim 406 or sidewall positioned inside the RF waveguide cavity so that an electric field 410 of the RF signal points into the crystal resonator, e.g., along a radius R of the WGM resonator towards a center C of the WGM resonator.

Figure 8:
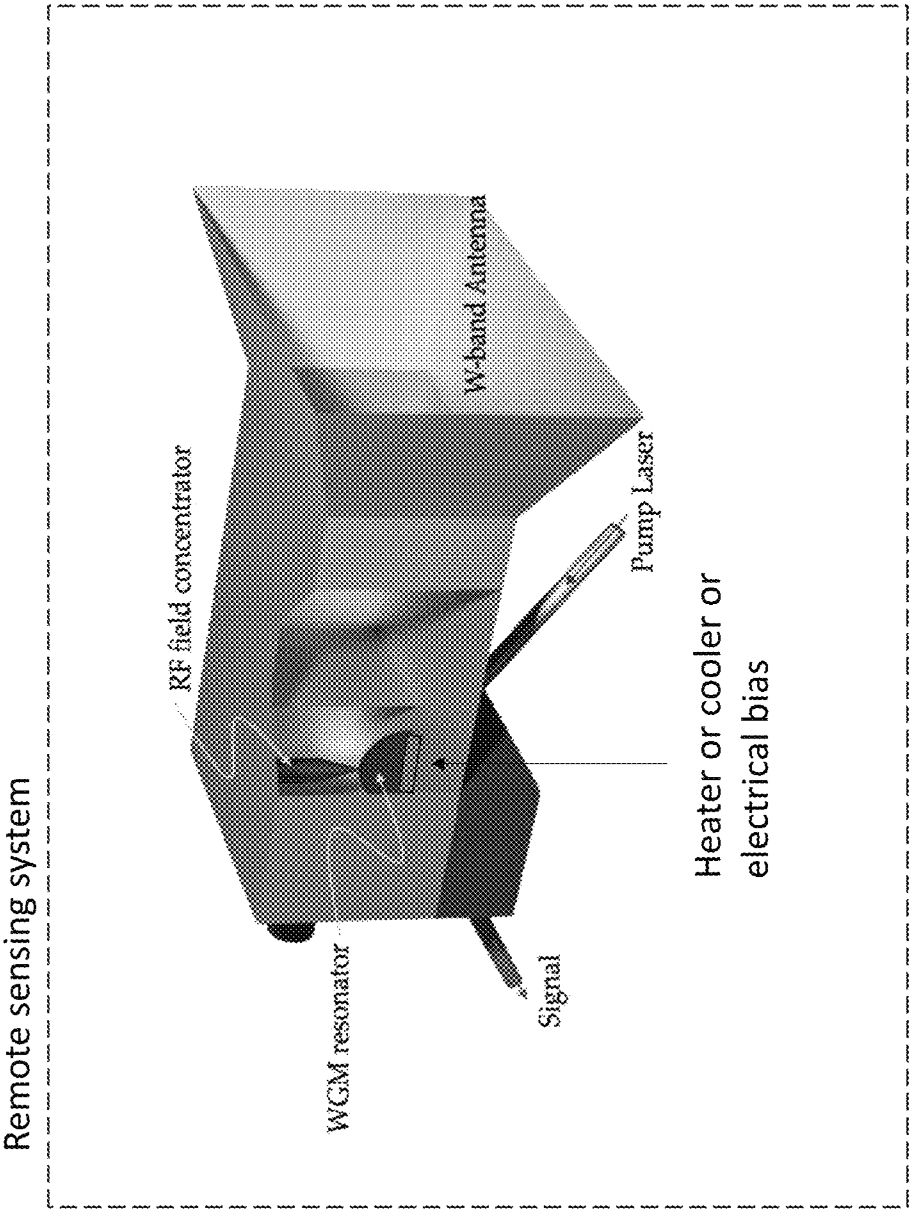
FIG. 8 illustrated the device coupled to a heater, cooler, or electrical bias for tuning and integrated in a remote sensing system.
Figure 9:
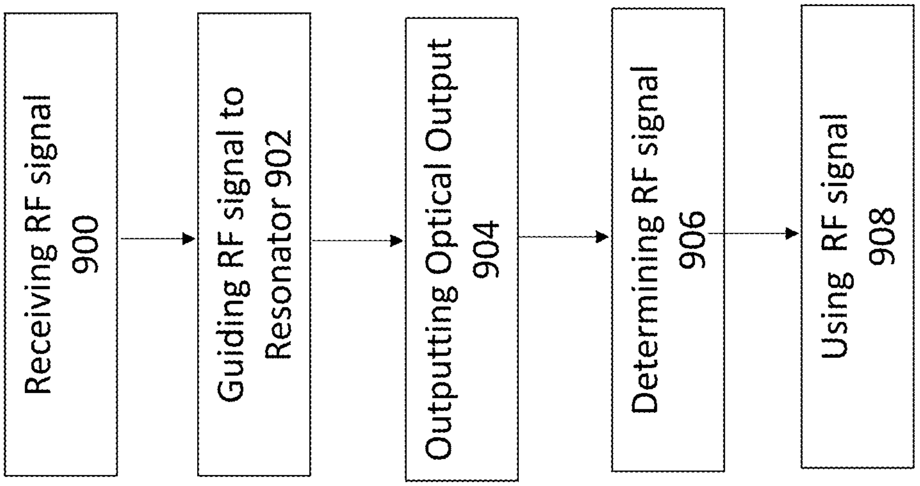
FIG. 9 is a flowchart illustrating a method of receiving and using and RF signal.

6. The device of any of the embodiments 1-5, further comprising an RF concentrator 116 comprising, consisting of, consisting essentially of a metal or dielectric post comprising a tapered end 422 coupled into the crystal resonator.
7. The device of embodiment 6, wherein the tapered end is coupled into a rim 406 or sidewall of the WGM resonator, such that the post has a longitudinal axis 424 along the radius R so as to concentrate the electric field of the RF wave/signal along the radius.
8. The device of any of the embodiments 3-7, wherein:
the WGM comprises a first mode coupling to a TM-polarized mode of the output signal and a second mode coupling to a TE polarized mode of the optical pump, and
a frequency separation between the first mode and the second mode matches the frequency of the RF signal.
9. The device of any of the embodiments 1-8, wherein an optical axis of the nonlinear material is along an axis of symmetry of the crystal resonator so that:
the TE-polarized mode of the pump interacts predominantly with an extraordinary index of refraction $n_e$ of the nonlinear material, and
the TM-polarized mode of the optical output interacts predominantly an ordinary index of refraction $n_0$ of the nonlinear material.
10. The device of any of the embodiments 1-9, wherein the resonant cavity has a length L to support a standing wave comprising the RF signal and the RF concentrator is positioned at a maximum of the electric field 410 in the resonant cavity.
11. The device of any of the embodiments 3-10, wherein the WGM comprises a disc having a radius R in a range of 0.2 millimeters (mm) to 1 mm (e.g., 0.2 mm≤R≤1 mm).
12. The device of any of the embodiments 3-11, wherein the WGM comprises a Q factor, a nonlinearity, and the radius such that the receiver (including a detection system 300 and antenna 104 for receiving the RF signal) has a noise temperature of no more than 105 Kelvin when operated at room temperature and the RF signal comprises a W band frequency. In the embodiments the representative noise temperature will be achievable if the Q-factor of resonator of diameter ~800 micron is >200 million for TM mode and >10 million for TE mode.
13. The device of any of the embodiments 1-12, wherein the nonlinear material comprises, consists of, consists essentially of a birefringent material so that the nonlinear interaction is an anti-stokes process.
14. The device of any of the embodiments 1-13, wherein the nonlinear material comprises lithium tantalate, lithium niobate, or a material having a nonlinearity and transparency at the optical pump's frequency that are at least as high as that of lithium tantalate or lithium niobate.
15. The device of any of the embodiments 1-14, wherein the RF signal has a frequency in a range of 1-1000 gigahertz (GHz), or in W band (75-110 GHz) and the optical pump is outputted from a laser having a wavelength at visible or infrared frequencies (e.g., wavelength in a range of 400 nm-10 microns). The optical output also has a wavelength in this range.
16. The device of any of the embodiments 1-15, further comprising at least one of:
a heating or cooling element (e.g., as illustrated in FIG. 8) thermally coupled to the crystal resonator for varying a temperature of the nonlinear material; or
a bias line applying a DC voltage across the nonlinear material;
so as tune a frequency separation of the modes to match the frequency of the RF signal using the different temperature dependencies and/or different DC electric field dependencies of the indices.
17. The device of any of the embodiments 1-16, further comprising a detection system 300 comprising a homodyne detection system for extracting the RF signal from the optical output.
18. FIG. 8 illustrates a remote sensing system (e.g., but not limited to, for sensing atmospheric gas, atmospheric species, or cloud) comprising the device of any of the embodiments 1-17, wherein the RF signal is used for RF sensing.
19. The device or method of any of the embodiments, further comprising a concentrator coupled to the crystal resonator and configured (e.g., dimensioned and comprising a material) to concentrate the electric field of the RF wave/signal in the crystal resonator.
20. FIG. 9 illustrates a method of receiving an RF signal, comprising:
receiving (block 900) an RF signal on an antenna;
using a waveguide interface to the antenna, guiding (Block 902) the (RF) signal to an RF waveguide cavity coupling the RF signal to a crystal resonator; wherein:
the crystal resonator comprises a nonlinear material generating an optical output in response to a nonlinear interaction between the RF signal and an optical pump in the resonator;
outputting (Block 904) the optical output to a detector/detection system, wherein the detector/detection system generates a signal in response to the optical output; and
determining (Block 906) the (e.g., amplitude and/or phase of) the RF signal from the signal, e.g., using a computer, e.g., comprising one or more memories, one or more processors executing one or more programs or an application (that may be stored on the memories) to determine the RF signal. In one or more examples, the computer is an application specific integrated circuit or field programmable gate array.

Block 908 represents optionally using the RF signal or data in the RF signal in an application (e.g., remote sensing, cloud radar).

21. The method of embodiment 20, using the device of any of the embodiments
22. A method of receiving an RF signal, comprising
receiving 900 an RF signal on an antenna;
guiding 902 the RF signal to the device of any of the embodiments 1-20;
outputting 904 the optical output from the device; and
determining 906 the (e.g., amplitude and/or phase of) the RF signal from the optical output.

Advantages and Improvements

Theoretical analysis and numeric modeling of a photonic receiver (e.g., suitable as a front end for a W-band (94 GHz) radar) demonstrates the receiver performs low-noise, coherent, frequency-resolving up-conversion of the returned radar signal from the W-band to a near-infrared optical signal. Detecting the optical signal instead of the RF signal enables significant advantages in reducing both the radar's noise and its SWaP.

As discussed herein, the sensitivity of the receiver can be quantified in terms of the noise temperature. For the ultra-sensitive receiver this temperature is predicted to be significantly lower than the ambient temperature. However, to date, even reaching the ambient temperature has remained an elusive experimental goal. The simulations disclosed herein, on the other hand, predict reaching a noise temperature at the level of 0.35 of the ambient temperature, on the absolute temperature scale. The prediction is made based on conservative assumptions and does not require improving any receiver elements beyond the state of the art. Taking the ambient temperature to be 300 K, the receiver noise temperature of 105 K is predicted without using any cooling implements. Comparing this to the typical noise temperature of a W-band low-noise amplifier which is optimistically around 600 K, the receiver described herein is predicted to achieve a factor of 6 in the SNR improvement. This improvement comes with a significant SWaP reduction due to a different SWAP budget of the photonic elements compared to the microwave elements. Further SWaP reduction can be traded for some of the SNR, if desired. This combination of factors makes the receiver an appealing solution for applications on SmallSats and CubeSats platforms.

The photonic device becomes feasible due to availability of high quality (Q-) factor micro-resonators made with electro-optic materials. For instance, optical whispering gallery mode (WGM) resonators made out of $LiNbO_3$ and $LiTaO_3$ have been successfully used in prototypes of functional devices for optical and microwave photonic applications. Millimeter-sized WGM resonators are characterized by optical bandwidth in the hundred kilohertz (weakly coupled) to gigahertz (fully loaded) range. Outstanding optical transparency as well as high electro-optical nonlinearity of lithium tantalate and niobate enables realizing a number of high performance photonic microwave receivers [6,7,23-31]. Resonant interaction of a few optical WGMs with a microwave or millimeter wave signal is supported by optimal shaping of the microwave resonator coupled to the optical WGM resonator.

REFERENCES

The following references are incorporated by reference herein.

1. Kummerow, C.; Barnes, W.; Kozu, T.; Shiue, J.; Simpson, J. The Tropical Rainfall Measuring Mission (TRMM) Sensor Package. Journal of Atmospheric and Oceanic Technology 1998, 15, 809 817. doi: 10.1175/1520-0426 (1998)015<0809:TTRMMT>2 0.CO; 2.
2. Stephens, G. L.; Vane, D. G.; Boain, R. J.; Mace, G. G.; Sassen, K.; Wang, Z.; Illingworth, A. J.; O'connor, E. J.; Rossow, W. B.; Durden, S. L.; Miller, S. D.; Austin, R. T.; Benedetti, A.; Mitrescu, C. THE CLOUDSAT MISSION AND THE A-TRAIN: A New Dimension of Space-Based Observations of Clouds and Precipitation. Bulletin of the American Meteorological Society 2002, 83, 1771-1790. doi: 10.1175/BAMS-83-12-1771.
3. Tanelli, S.; Durden, S. L.; Im, E.; Pak, K. S.; Reinke, D. G.; Partain, P.; Haynes, J. M.; Marchand, R. T. CloudSat's Cloud Profiling Radar After Two Years in Orbit: Performance, Calibration, and Processing. IEEE Transactions on Geoscience and Remote Sensing 2008, 46, 3560-3573. doi: 10.1109/TGRS.2008.2002030.
4. Hou, A. Y.; Kakar, R. K.; Neeck, S.; Azarbarzin, A. A.; Kummerow, C. D.; Kojima, M.; Oki, R.; Nakamura, K.; Iguchi, T. The Global Precipitation Measurement Mission. Bulletin of the American Meteorological Society 2014, 95, 701-722. doi: 10.1175/BAMS-D-13-00164.1.
5. Tanelli, S.; Haddad, Z. S.; Im, E.; Durden, S. L.; Sy, O. O.; Peral, E.; Sadowy, G. A.; SanchezBarbetty, M. Radar concepts for the next generation of spacebome observations of cloud and precipitation processes. 2018 IEEE Radar Conference (RadarConf18), 2018, pp. 1245-1249. doi: 10.1109/RADAR.2018.8378741.
6. Ilchenko, V. S.; Savchenkov, A. A.; Matsko, A. B.; Maleki, L. Whispering-gallery-mode electrooptic modulator and photonic microwave receiver. JOSA B 2003, 20, 333-341.
7. Ilchenko, V.; Matsko, A.; Solomatine, I.; Savchenkov, A.; Seidel, D.; Maleki, L. K $K_a$ Band All-Resonant Photonic Microwave Receiver. Phot. Tech. Lett. 2008, 20, 1600-1612.
8. Matsko, A. B.; Strekalov, D. V.; Yu, N. Sensitivity of terahertz photonic receivers. Phys. Rev. A 2008, 77, 043812.
9. Strekalov, D. V.; Savchenkov, A. A.; Matsko, A. B.; Yu, N. Efficient upconversion of subterahertz radiation in a high-Q whispering gallery resonator. Opt. Lett. 2009, 34, 713-715.
10. Strekalov, D. V.; Schwefel, H. G. L.; Savchenkov, A. A.; Matsko, A. B.; Wang, L. J.; Yu, N. Microwave whispering-gallery resonator for efficient optical up-conversion. Phys. Rev. A 2009, 80, 033810.
11. Savchenkov, A. A.; Liang, W.; Matsko, A. B.; Ilchenko, V. S.; Seidel, D.; Maleki, L. Tunable optical single-sideband modulator with complete sideband suppression. Opt. Lett. 2009, 34, 1300-1302.
12. Matsko, A. B.; Savchenkov, A. A.; Ilchenko, V. S.; Seidel, D.; Maleki, L. On the Sensitivity of All-Dielectric Microwave Photonic Receivers. J. Lightwave Tech. 2010, 28, 3427-3438.
13. Savchenkov, A. A.; Ilchenko, V. S.; Liang, W.; Eliyahu, D.; Matsko, A. B.; Seidel, D.; Maleki, L. Voltage-controlled photonic oscillator. Opt. Lett. 2010, 35, 1572-1574
14. Savchenkov, A. A.; Liang, W.; Ilchenko, V. S.; Dale, E.; Savchenkova, E. A.; Matsko, A. B.; Seidel, D.; Maleki, L. Photonic E-field sensor. AIP Advances 2014, 4, 122901.
15. Andrews, R. W.; Peterson, R. W.; Purdy, T. P.; Cicak, K.; Simmonds, R. W.; Regal, C. A.; Lehnert, K. W. Bidirectional and Efficient Conversion between Microwave and Optical Light. Nat. Phys. 2014, 10, 321-326.
16. Rueda, A.; Sedlmeir, F.; Collodo, M. C.; Vogl, U.; Stiller, B.; Schunk, G.; Strekalov, D. V.; Marquardt, C.; Fink, J. M.; Painter, O.; Leuchs, G.; Schwefel, H. G. L. Efficient microwave to optical photon conversion: an electro-optical realization. Optica 2016, 3, 597-604.
17. Santamaría Botello, G.; Sedlmeir, F.; Rueda, A.; Abdalmalak, K. A.; Brown, E. R.; Leuchs, G.; Preu, S.; Segovia-Vargas, D.; Strekalov, D. V.; García Muñoz, L. E.; Schwefel, H. G. L. Sensitivity Limits of Millimeter-Wave Photonic Radiometers Based on Efficient Electro-Optic Upconverters. Optica 2018, 5, 12101219.
18. Zhu, N.; Zhang, X.; Zhang, X.; Han, X.; Han, X.; Zou, C. L.; Zou, C. L.; Zhong, C.; Zhong, C.; Wang, C. H.; Wang, C. H.; Jiang, L.; Jiang, L.; Tang, H. X. Waveguide Cavity Optomagnonics for Microwave-to-Optics Conversion. Optica, OPTICA 2020, 7, 1291-1297.
19. Forsch, M.; Stockill, R.; Wallucks, A.; Marinković, I.; Gärtner, C.; Norte, R. A.; van Otten, F.; Fiore, A.; Srinivasan, K.; Gröblacher, S. Microwave-to-Optics Conversion Using a Mechanical Oscillator in Its Quantum Ground State. Nat. Phys. 2020, 16, 69-74.

20. Hease, W.; Rueda, A.; Sahu, R.; Wulf, M.; Arnold, G.; Schwefel, H. G.; Fink, J. M. Bidirectional Electro-Optic Wavelength Conversion in the Quantum Ground State. PRX Quantum 2020, 1, 020315.
21. Santamaría-Botello, G.; Popovic, Z.; Abdalmalak, K. A.; Segovia-Vargas, D.; Brown, E. R.; García Muñoz, L. E. Sensitivity and Noise in THz Electro-Optic Upconversion Radiometers. Scientific Reports 2020, 10, 9403.
22. Xu, Y.; Sayem, A. A.; Fan, L.; Zou, C. L.; Wang, S.; Cheng, R.; Fu, W.; Yang, L.; Xu, M.; Tang, H. X. Bidirectional Interconversion of Microwave and Light with Thin-Film Lithium Niobate. Nat Commun 2021, 12, 4453.
23. Ilchenko, V. S.; Yao, X. S.; Maleki, L. Microsphere integration in active and passive photonics devices. Proc. SPIE 2000, 3930, 154-162.
24. Ilchenko, V. S.; Maleki, L. Novel whispering-gallery resonators for lasers, modulators, and sensors. Proc. SPIE 2001, 4270, 120-130.
25. Cohen, D. A.; Levi, A. F. J. Microphotonic millimetre-wave receiver architecture. Electron. Lett. 2001, 37, 37-39(2).
26. Cohen, D. A.; Hossein-Zadeh, M.; Levi, A. F. J. Microphotonic modulator for microwave receiver. Electron. Lett. 2001, 37, 300-301(1).
27. Cohen, D. A.; Levi, A. F. J. Microphotonic components for a mm-wave receiver. Solid-St. El. 2001, 45, 495-505.
28. Cohen, D. A.; Hossein-Zadeh, M.; Levi, A. F. J. High-Q microphotonic electro-optic modulator. Solid-St. El. 2001, 45, 1577-1589.
29. Ilchenko, V.; Savchenkov, A.; Matsko, A.; Maleki, L. Sub-microwatt photonic microwave receiver. Phot. Tech. Lett. 2002, 14, 1602-1604.
30. Hossein-Zadeh, M.; Levi, A. Self-homodyne RF-optical LiNbO3 microdisk receiver. Solid-St. El. 2005, 49, 1428-1434.
31. Hossein-Zadeh, M.; Levi, A. 14.6-GHz LiNbO3 microdisk photonic self-homodyne RF receiver. Microwave Theory and Techniques, IEEE Transactions on 2006, 54, 821-831.
32. Gordon, E. I.; Rigden, J. D. The Fabry-Perot Electrooptic Modulator. Bell System Tech. J. 1963, 42, 155-179.
33. Alferness, R. Waveguide Electrooptic Modulators. Microwave Theory and Techniques, IEEE Transactions on 1982, 30, 1121-1137.
34. Ho, K. P.; Kahn, J. Optical frequency comb generator using phase modulation in amplified circulating loop. Phot. Tech. Lett. 1993, 5, 721-725.
35. Kawanishi, T.; Oikawa, S.; Higuma, K.; Matsuo, Y.; Izutsu, M. LiNbO3 resonant-type optical modulator with double-stub structure. Electron. Lett. 2001, 37, 1244-1246.
36. Gheorma, I. L.; Osgood, R. M., J. Fundamental limitations of optical resonator based highspeed EO modulators. Phot. Techn. Lett. 2002, 14, 795-797.
37. Kato, M.; Fujiura, K.; Kurihara, T. Generation of superstable 40 GHz pulses from Fabry-Perot resonator integrated with electro-optic phase modulator. Electron. Lett. 2004, 40, 299-301.
38. Benter, N.; Bertram, R. P.; Soergel, E.; Buse, K.; Apitz, D.; Jacobsen, L. B.; Johansen, P. M. Large-area Fabry-Perot modulator based on electro-optic polymers. Appl. Opt. 2005, 44, 6235-6239.
39. Kato, M.; Fujiura, K.; Kurihara, T. Generation of a superstable Lorentzian pulse train with a high repetition frequency based on a Fabry-Perot resonator integrated with an electro-optic phase modulator. Appl. Opt. 2005, 44, 1263-1269.
40. Rabiei, P.; Steier, W. H.; Zhang, C.; Dalton, L. R. Polymer Micro-Ring Filters and Modulators. J. Lightwave Tech. 2002, 20, 1968.
41. Weldon, M.; Hum, S.; Davies, R.; Okoniewski, M. Traveling-wave ring circuit for resonant enhancement of electrooptic modulators. Phot. Tech. Lett. 2004, 16, 1295-1297.
42. Tazawa, H.; Steier, W. Linearity of ring resonator-based electro-optic polymer modulator. Electron. Lett. 2005, 41, 1297-1298(1).
43. Tazawa, H.; Steier, W. H. Analysis of ring resonator-based traveling-wave modulators. Phot. Techn. Lett. 2006, 18, 211-213.
44. Tazawa, H.; Kuo, Y. H.; Dunayevskiy, I.; Luo, J.; Jen, A. K. Y.; Fetterman, H. R.; Steier, W. H. Ring Resonator-Based Electrooptic Polymer Traveling-Wave Modulator. J. Lightwave Tech. 2006, 24, 3514-3519.
45. Bortnik, B.; Hung, Y. C.; Tazawa, H.; Seo, B. J.; Luo, J.; Jen, A. K. Y.; Steier, W. H.; Fetterman, H. R. Electrooptic Polymer Ring Resonator Modulation up to 165 GHz. J. Sel. T. Q. El. 2007, 13, 104-110.
46. Boyd, R. W. Nonlinear optics, 3rd ed. ed.; Academic Press: New York, 2003.
47. Breunig, I.; Sturman, B.; Sedlmeir, F.; Schwefel, H. G. L.; Buse, K. Whispering gallery modes at the rim of an axisymmetric optical resonator: analytical versus numerical description and comparison with experiment. Opt. Expr. 2013, 21, 30683-30692.
48. Demchenko, Y. A.; Gorodetsky, M. L. Analytical estimates of eigenfrequencies, dispersion, and field distribution in whispering gallery resonators. JOSA B 2013, 30, 3056-3063.
49. Abedin, K. S.; Ito, H. Temperature-dependent Dispersion Relation of Ferroelectric Lithium Tantalate. Journal of Applied Physics 1996, 80, 6561-6563.
50. Lim, H. H.; Kurimura, S.; Katagai, T.; Shoji, I. Temperature-Dependent Sellmeier Equation for Refractive Index of 1.0 Mol % Mg-Doped Stoichiometric Lithium Tantalate. Jpn. J. Appl. Phys. 2013, 52, 032601.
51. Schermer, R. T.; Stievater, T. H. Millimeter-Wave Dielectric Properties of Highly Refractive Single Crystals Characterized by Waveguide Cavity Resonance. IEEE Transactions on Microwave Theory and Techniques 2019, 67, 1078-1087. doi:10.1109/TMTT.2018.2883107.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A device useful as a receiver, comprising:

a waveguide interface to an antenna guiding a radio frequency (RF) signal to an RF waveguide cavity coupling the RF signal to a photonic circuit comprising a tunable crystal resonator; wherein:

the tunable crystal resonator comprises a nonlinear material generating an optical output with photonic gain in response to a nonlinear interaction between the RF signal and an optical pump in the tunable crystal resonator tuned for a frequency of the RF signal; and an optical port coupled to the tunable crystal resonator for outputting the optical output with photonic gain from which the RF signal can be determined.

2. The device of claim 1, wherein the tunable crystal resonator tuned for the RF signal supports a pair of modes separated in frequency by the frequency of the RF signal.

3. The device of claim 2, further comprising at least one of:

a heating or cooling element thermally coupled to the crystal resonator for varying a temperature of the nonlinear material; or a bias line applying a DC voltage across the nonlinear material;

so as tune a frequency separation of the modes to match the frequency of the RF signal using the different temperature dependencies and/or different DC electric field dependencies of indices of refraction of the nonlinear material.

4. The device of claim 1, wherein the tunable crystal resonator comprises a whispering gallery mode (WGM) resonator.

5. The device of claim 4, wherein:

the RF waveguide cavity comprises a resonant cavity bounded by reflectors for an RF wave comprising the RF signal, and the WGM resonator comprises a rim positioned inside the RF waveguide cavity so that an electric field of the RF signal points along a radius of the WGM resonator towards a center of the WGM resonator.

6. The device of claim 5, further comprising an RF concentrator comprising a metal or dielectric post comprising a tapered end coupled into the rim, wherein the post has a longitudinal axis along the radius so as to concentrate the electric field along the radius.

7. The device of claim 6, wherein the resonant cavity has a length to support a standing wave comprising the RF signal and the RF concentrator is positioned at a maximum of the electric field in the resonant cavity and/or wherein the WGM resonator comprises a disc having the radius in a range of 0.2 mm to 1 mm.

8. The device of claim 7, wherein:

the WGM resonator comprises a Q factor, a nonlinearity, and the radius such that the receiver has a noise temperature of no more than 105 Kelvin when operated at room temperature and the RF signal comprises a W band frequency.

9. The device of claim 8, wherein the nonlinear material comprises lithium tantalate, lithium niobate, or a material having the nonlinearity and transparency at the optical pump's frequency that are at least as high as that of lithium tantalate or lithium niobate.

10. The device of claim 4, wherein:

the WGM resonator comprises a first mode coupling to a TM-polarized mode of the optical output and a second mode coupling to a TE polarized mode of the optical pump, and a frequency separation between the first mode and the second mode matches the frequency of the RF signal.

11. The device of claim 4, wherein an optical axis of the nonlinear material is along an axis of symmetry of the WGM resonator so that:

a TE-polarized mode of the optical pump interacts predominantly with an extraordinary index of refraction $n_e$ of the nonlinear material, and a TM-polarized mode of the optical output interacts predominantly an ordinary index of refraction $n_0$ of the nonlinear material.

12. The device of claim 1, wherein the the nonlinear interaction is an anti-stokes process.

13. The device of claim 1, wherein the RF signal has a frequency in a W band and the optical pump is outputted from a laser and has a wavelength at a visible frequency or infrared frequency.

14. A remote sensing system comprising the device of claim 1.

15. The device of claim 1, wherein the receiver determines the RF signal with sub ambient noise temperature.

16. A platform comprising at least one of a spaceborne receiver or a satellite comprising the device of claim 1.

17. A device useful as a receiver, comprising:

a waveguide interface to an antenna guiding a radio frequency (RF) signal to an RF waveguide cavity coupling the RF signal to a crystal resonator; wherein:

the crystal resonator comprises a nonlinear material generating an optical output in response to a nonlinear interaction between the RF signal and an optical pump in the crystal resonator;

an optical port coupled to the crystal resonator for outputting the optical output from which the RF signal received on the antenna can be determined; and a detection system coupled to the optical port and comprising a homodyne detection system for extracting the RF signal from the optical output.

18. A method of making a device useful in a receiver, comprising coupling a waveguide interface, comprising an RF waveguide cavity, to a tunable crystal resonator; wherein the tunable crystal resonator comprises a nonlinear material generating an optical output in response to a nonlinear interaction between an RF signal and an optical pump in the tunable crystal resonator tuned for a frequency of the RF signal; and coupling an optical port to the tunable crystal resonator for outputting the optical output with photonic gain from which the RF signal can be determined.

19. The method of claim 18, wherein the tunable crystal resonator comprises a whispering gallery mode (WGM) resonator comprising a disc having a radius and a rim, and the method further comprises coupling an RF concentrator, comprising a metal or dielectric post comprising a tapered end, into the rim so that the post has a longitudinal axis along the radius.

20. The method of claim 19, wherein the RF waveguide cavity comprises a resonant cavity bounded by reflectors for the RF wave, the method further comprising:

positioning the rim of the WGM resonator inside the RF waveguide cavity so that an electric field of the RF signal points along a radius of the WGM resonator towards a center of the WGM resonator, and wherein the resonant cavity has a length to support a standing wave comprising the RF signal and the RF concentrator is positioned at a maximum of the electric field in the resonant cavity; and coupling at least one of:

a heating or cooling element to the tunable crystal resonator for varying a temperature of the nonlinear material; or a bias line applying a DC voltage across the nonlinear material;

so as tune a frequency separation of the modes of the WGM resonator to match the frequency of the RF signal using the different temperature dependencies and/or different DC electric field dependencies of the indices of refraction of the nonlinear material.

21. A device, comprising:

an unmanned vehicle comprising a receiver, wherein the receiver comprises an antenna coupled to a photonic circuit determining an RF signal received on the antenna from an optical output generated with photonic gain, wherein the photonic circuit generates the optical output in response to the RF signal using a pump signal and/or wherein the photonic circuit comprises a non-linear material generating the photonic gain according to a Stokes process.

22. The device of claim 21, wherein the unmanned vehicle comprises at least one of a spaceborne platform or a satellite.

* * * * *